United States Patent [19]
Schmidt

[11] 3,818,224

[45] June 18, 1974

[54] MEASUREMENT SYSTEM
[75] Inventor: Robert W. Schmidt, Oak Lawn, Ill.
[73] Assignee: Copar Corporation, Oak Lawn, Ill.
[22] Filed: Jan. 2, 1973
[21] Appl. No.: 320,526

[52] U.S. Cl. ........ 250/231 SE, 250/237 R, 356/170
[51] Int. Cl. ............................................. G01d 5/34
[58] Field of Search ...... 250/231 R, 231 SE, 237 R, 250/219 D, 237 G; 356/169, 170

[56] References Cited
UNITED STATES PATENTS

| | | | |
|---|---|---|---|
| 2,953,777 | 9/1960 | Gridley | 250/231 SE |
| 3,058,001 | 10/1962 | Dertouzos | 250/231 SE |
| 3,078,404 | 2/1963 | Dumaire | 250/231 SE |
| 3,312,828 | 4/1967 | Wingate | 250/231 R |
| 3,358,202 | 12/1967 | Pabst | 250/231 R |
| 3,512,006 | 5/1970 | Haller | 250/231 R |
| 3,525,094 | 8/1970 | Leonard | 250/231 SE |
| 3,590,260 | 6/1971 | Holmes | 250/231 R |

Primary Examiner—James W. Lawrence
Assistant Examiner—D. C. Nelms
Attorney, Agent, or Firm—Kizer, Plyer, Dorn & McEachran

[57] ABSTRACT

A measurement system for converting length or distance from a reference point to a binary coded decimal (BCD) so that an electronic instrument can provide a length or distance readout or provide automatic setting of a machine part such as a spindle, slitter, slotter or positioning of guides at a predetermed distance setting.

10 Claims, 5 Drawing Figures

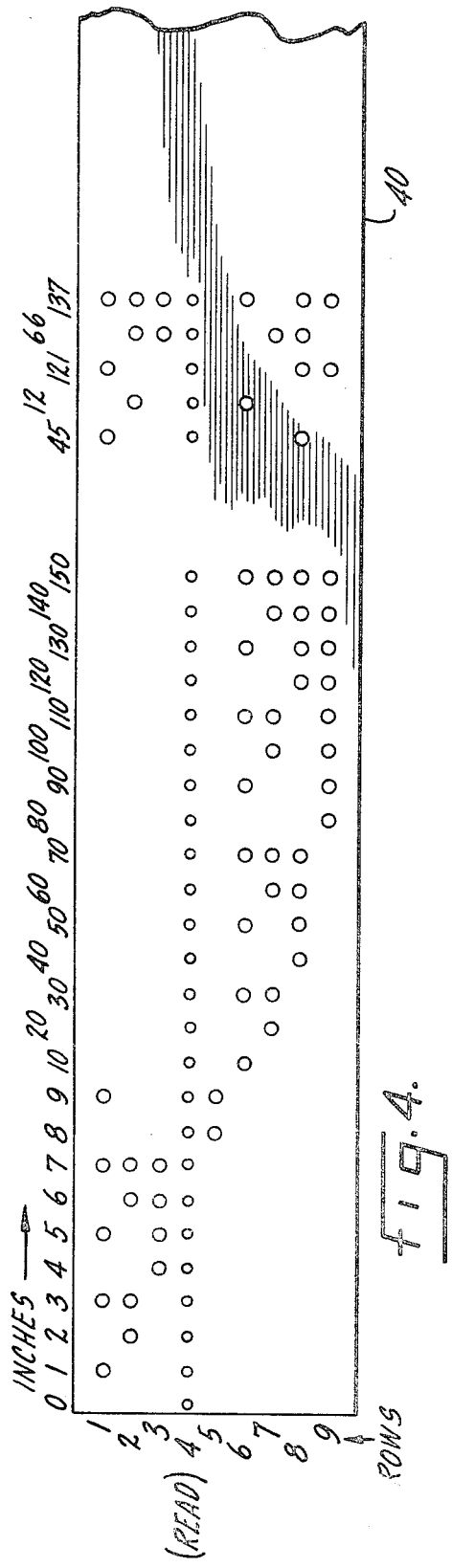
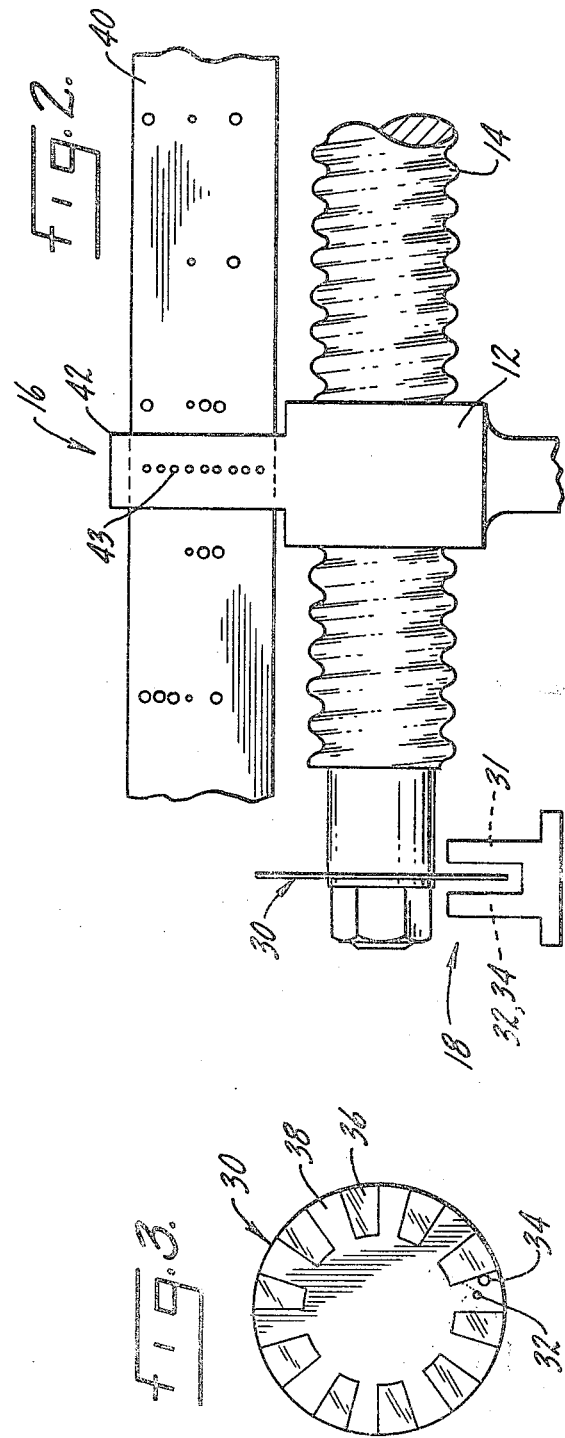

MEASUREMENT SYSTEM

SUMMARY OF THE INVENTION

The present invention is in the field of measurement systems and relates to converting length or distance from a reference point to a binary coded decimal so that an electronic instrument can provide a length or distance readout or provide automatic setting of machine parts at a predetermined length or distance setting.

Measurements of this type are utilized in many machine operations such as cutting corrugated cardboard to a predetermined width which may exceed thirteen feet with accuracy requirements of 1/64th of an inch. This is equivalent to an end result accurate to one part in ten thousand without including setting tolerances or machine errors. The complexity of such a measurement is apparent.

Serial pulse counting is relatively simple but is subject to electrical noise, current interruption problems and must be started from a known point with a known value. Also, the number of pulses generated in measuring thirteen feet would exceed 15,000 pulses with the entire counting process subject to accumulated errors.

The encoder which converts distance directly into binary code requires a high degree of precision for either a brush type or optical type encoder. The bit storage would also exceed 10,000 units and require extensive circuitry for readout or control.

Accordingly, it is an object of the present system to provide a measurement that is re-established or re-validated automatically regardless of errors introduced due to electrical noise or other sources.

Another object is a measurement system that is inexpensive, easily manufactured and easily maintained.

Another object is a measurement system that provides distance information from the reference point in either direction toward or away from the reference.

Another object is a measurement system that easily restores correct measurements after a current interruption without returning to the reference point.

Another object is a measurement system that has a capability of at least 150 inches of counting and storage with a maximum non-cumulative error of 1/64th of an inch in the overall measurement.

Other objects will appear from time to time in the ensuing specification, drawings and claims.

BRIEF DESCRIPTION OF THE DRAWINGS

FIG. 2 is an enlarged view of portions of the measurement system of FIG. 1;

FIG. 3 is a side view of the photo film disc of FIG. 2;

FIG. 4 is an enlarged view of the punched tape of the measurement system of FIG. 1.

BRIEF DESCRIPTION OF THE INVENTION

Figure 1:
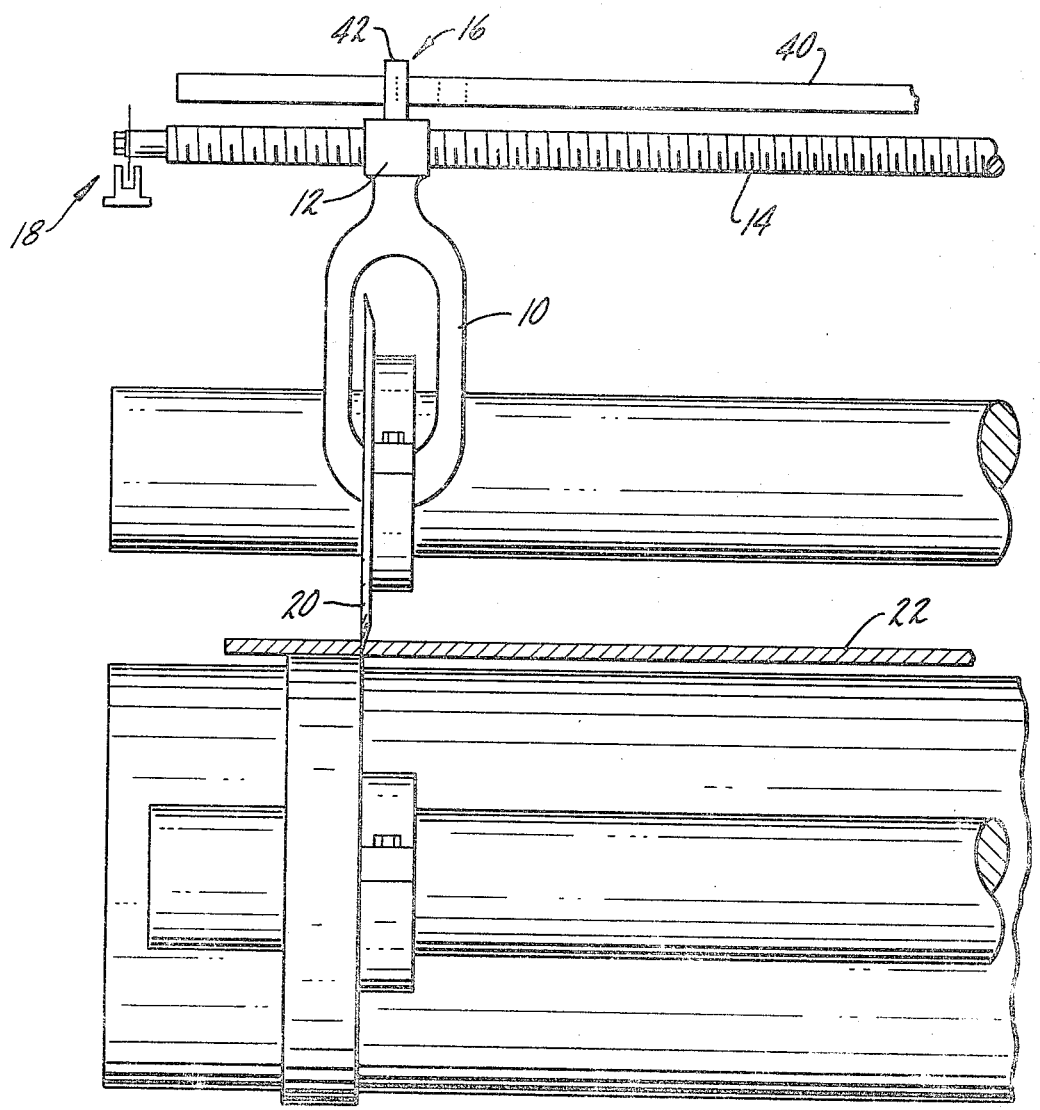
FIG. 1 is a view of a cardboard slitter that utilizes the measurement system.

The measurement system of FIGS. 1 through 5 is shown as it applies to the measurement of a machine part 10 in FIG. 1 which is affixed to a nut 12 which is positioned by the system. The measurement system includes a machine screw 14, which positions the nut 12 with affixed machine part 10; punched tape and sensor means 16 to provide indications for units, tens and one hundreds readings which is positioned along the screw 14; pulse indicating means 18 to provide tenths and hundredths readings; and electronic circuit means to combine indications from the punched tape means and the pulse indicating means. The machine part 10 may be a cardboard slitter with slitting means 20 to cut moving corrugated board or cardboard 22. It should be understood, however, that the invention has many other uses and should not be restricted to the precise structure shown.

The pulse indicating means 18 to indicate tenths and hundredths includes a photo film disc 30 mounted at the end of the machine screw 14 so as to rotate with the screw and a light source 31 that is not shown in detail and two photo cells 32 and 34. The light source 31 and the photo cells are located on opposite sides of the photo film disc 30. The photo film disc 30 has spokes formed by alternate transparent portions 36 and opaque portions 38 so that as the wheel rotates the spokes interrupt the light beam between the light source and the photo cells 32 and 34 which are both mounted on the same side of the disc 30, but offset so as to be approximately one-half the spoke diameter apart. The number of spokes is determined by the pitch diameter of the machine screw 14 so that the correct number of pulses are transmitted to the electronic circuit means. If the pitch of the machine screw is 0.2 inches per revolution, than a photo disc with ten spokes will produce 10 pulses for each photo cell per revolution of the screw for a total of 20 pulses. Since the pitch of the screw is 0.2 inches per revolution the nut will move axially 0.01 inch per pulse. It should be understood that many other combinations of screw pitch and spokes are equally satisfactory.

The punched tape and sensor means 16 that provides indications for units, tens and hundreds includes a punched tape 40 which is positioned along the machine screw 14 and a tape sensor assembly 42 that is affixed to the nut 12. The punched tape 40, portions of which are shown in detail in FIG. 4, has nine rows where holes may be punched so as to code the tape in standard binary coded decimal. The tape is punched at exactly one inch increments consecutively from 0 to 159 inches such as by means of an accurate rule and a suitable tape punch. Rows 1, 2, 3 and 5 are used for the units digit and rows 6, 7, 8 and 9 contain the tens and hundreds digits. Row 4 contains smaller holes and is used to produce a read signal that will be explained in detail hereinafter. To code the punched tape 40 according to standard binary coded decimal systems the units rows 1, 2, 3 and 5 represent the powers of 2; 1, 2, 4 and 8. The rows 6, 7, 8 and 9 are assigned the values of 10, 20, 40 and 80 respectively. The various combinations of punched holes to represent the appropriate inch marks can be seen in FIG. 4. For example, at the 137 inch mark there will be punched holes in rows 1, 2, 3, 6, 8 and 9 with, of course, a punched hole in the read row 4. There is a punched hole in row 4 at every inch increment because this is where the electronic circuit means is to read the coded inch marks. According to the powers of 2 assigned to each row, the punched holes represent the combination of 1, 2, 4, 10, 40 and 80 which, of course, totals 137. The tape sensor assembly 42 is fastened on top of the nut 12 and moves with the nut along machine screw 14. The tape sensor assembly 42 includes a tape sensor 43 for each of the nine rows on the punched tape 40. Each tape sensor has a light source that is not shown and a photo sensor such that an indication is transmitted to the electronic circuit means each time a tape sensor 43 passes a hole in the tape. The tape sensor assembly 42 is constructed such that the tape 40 passes through the tape sensor with the light source and the photo sensor for each tape sensor on opposite sides of the tape 40.

As the machine screw 14 is rotated the nut 12 with affixed machine part 10 moves along the tape with the tape sensor assembly 42 producing coded pulses at each inch along the tape identifying the distance from the reference point. The photo cells 32 and 34 also produce pulses as the machine screw 14 rotates with the attached photo film disc 30 at the rate of one pulse per 0.01 inch.

Figure 5:
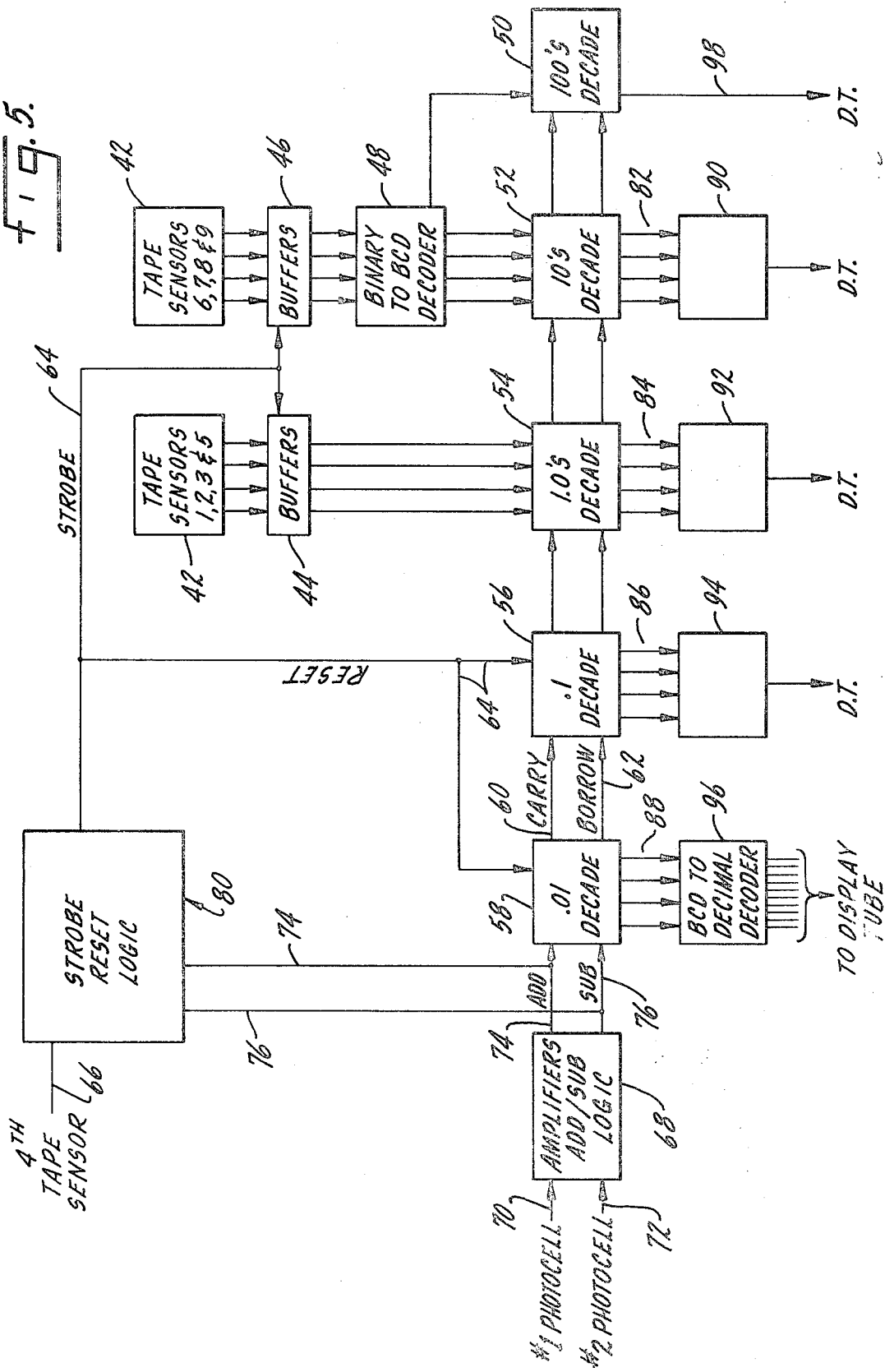
FIG. 5 is a block diagram representation of portions of the measurement system.

The electronic circuit means in FIG. 5 combines the inputs from the tape sensor assembly 42 containing information at even inch points and the pulses obtained at 0.01 inch increments from the photo cells 32 and 34 mounted around the photo film disc 30. Buffers 44 and 46 may be provided to properly condition the input signals from the tape sensors of assembly 42. The buffer 46 then drives a binary to BCD decoder 48 which in turn drives the 100's decade counter 50 and the 10's decade counter 52. Buffer 44 drives the units decade counter 54. The output of the electronic circuit means drives a suitable display device which indicates the position of machine part 10 up to the hundredths place, such as 137.56 inches. The electronic circuit means is primarily a five decade serial counter with one hundreds decade 50, tens decade 52, ones decade 54, 0.1 decade 56 and 0.01 decade 58. Each decade has a carry interconnection 60 and a borrow interconnection 62 with the preceding and succeeding decade. The strobe line 64 controls the inputs to the ones, tens and one hundreds decades and provides a zero reset for the 0.1 and 0.01 decades. The strobe and reset line 64 actuates the decade counters whenever a read indication is obtained from the fourth row tape sensor 66 and the add/sub logic 68 is in the add or subtract mode. The add/subtract logic 68 has input 70 from photo cell 32 and input 72 from photo cell 34.

As discussed earlier, the photo cells 32 and 34 are offset such that if photo disc 30 is rotating counter-clockwise an indication from photo cell 32 will be obtained before an indication from photo cell 34 which allows for directional discrimination. If the photo film disc 30 were rotating clockwise, indicating that machine screw 14 was moving the nut 12 in a direction opposite to that which causes counterclockwise rotation of photo film disc 30, an indication from photo cell 34 would be obtained before an indication from photo cell 32. The add/subtract logic 68 examines both the positive and negative going edges of the pulses from both photo cells 32 and 34 to provide directional discrimination which results in twenty pulses with twenty positive edges and twenty negative edges per revolution of the machine screw 14. Therefore, the add/subtract logic 68 divides by 2 for each 0.01 inch pulse so that it takes two pulse edges each occuring 0.005 inches apart to account for a 0.01 inch increment signal.

The output of the add/subtract logic 68 is an add mode line 74 and a subtract mode line 76 which connect to the 0.01 decade 58 and also to the strobe reset logic 80. Whenever a pulse from photo cell 32, the first photo cell, is obtained followed by a pulse from the second photo cell 34 and add/subtract logic 68 produces an add pulse at 74. Conversely, whenever there is an indication from the second photo cell 34 followed by an indication from the first photo cell 32, the add/subtract logic 68 produces a subtract pulse at line 76. The strobe reset logic 80 by means of standard logic gates combines the add line 74, the subtract line 76 and the fourth tape sensor output 66 to produce a logic output at strobe reset line 64 whose function as mentioned previously is to enter the tape sensor or coded inch information to the decade counters 52 and 54 when the fourth row tape sensor 66 provides a "read" indication and the add/subtract logic is in the add or subtract mode. Also, the strobe reset logic 80 provides a reset to zero for the 0.1 decade 56 and the 0.1 decade 58 whenever the fourth row tape sensor indicates that the punched tape is at the even inch increments. The reset to zero of the 0.1 decade 56 and the 0.01 decade 58 is required to allow for the non-accumulative error by returning the 0.1 and 0.01 decades to a zero reading at the incremental inch mark. The logic is designed to produce an output at line 64 under the following two conditions: when the positive going edge of the read signal occurs at 66 and the add line 74 is high; and when the negative going edge of the read signal occurs at 66 and the subtract line 76 is high. This corresponds to the forward and reverse directions of movement. The error due to the read hole diameter is eliminated by resetting the logic at the same physical edge of the read hole in row four of the tape 40 regardless of the direction of travel. The positive going edge of the read signal at 66 in the forward direction of travel and the negative going edge of the read signal in the reverse direction correspond to the same physical position on the punched tape. Also, if there is a current interruption causing erroneous counts, the measurement would be corrected to the even inch reading each time the nine photo cell sensors pass the even inch punching on the punch tape 40.

The fourth row tape sensor scans a smaller hole than the other eight rows to prevent the read indication from occuring over too wide a range around the even inch mark, thereby resetting the tenths and hundredths decades to zero before the correct point. The photo cells from the sensors on the remaining eight rows only need to be aligned with sufficient accuracy such that they are all in the read position when the number 4 hole produces its read signal.

The outputs 82 of counter 52, 84 of counter 54, 86 of counter 56 and 88 of counter 58 are connected to BCD to decimal decoders 90, 92, 94 and 96 respectively. The outputs of the decoders 90, 92, 94 and 96 along with the output 98 of the hundreds counter 50 are then connected to a suitable display or readout device such as a display tube. The output of each BCD to decimal decoder will have 10 wires that connect to a display device.

The inexpensive punch tape which is very accurate at one inch increments has then been combined with the pulse counting inputs from the photo disc 30 which is accurate to 1/100ths of an inch between the even inch increments to produce a total measurement which has non-accumulated error due to the correction at each even inch increment.

The measurement system may then be utilized to accurately position a machine part 10 with a cardboard slitter 20 on machine screw 14 to cut corrugated cardboard to any desired width accurate to at least 1/64th of an inch. The desired width to be cut may be read directly from a display device at the output of the electronic circuit means as the machine part moves along the machine screw by means of nut 12. The movement of the nut is discontinued when the desired point is reached or a suitable comparison means might automatically stop the movement of the nut along machine screw 14 when the preselected point is reached as determined by programmed information by an operator.

Whereas the preferred form of the invention has been shown and described herein, it should be realized that there may be many modifications, substitutions and alterations thereto.

I claim:

1. A measurement system for converting distance from a reference point to a coded signal that is suitable as an input to an electronic instrument that provides a length or distance readout, including:
   a movable element, the position of which relative to a reference point is to be determined,
   first measuring means for providing coded signals indicative of distance information of larger increments, means defining a linear path for said element adjacent said first measuring means, said element being movable with respect to said reference point in said defined linear path relative to said first measuring means, with the position of said element on said defined path determining the composition of said coded signals,
   second measuring means for providing coded signals indicative of distance information of smaller increments and including a rotatable measuring member cooperatively associated with the means defining said linear path, movement of said element in said defined path causing rotation of said measuring member, with movement of said measuring member causing said second measuring means to provide coded signals indicative of movement of said element,
   electronic circuit means for combining inputs of said first and second measuring means to provide outputs with information of distance from said reference point that is accurate to the smaller increment and has a range of the total number of the larger increments.

2. The measurement system of claim 1 further characterized in that said first measuring means includes a linearly extending measuring member, said defined path being adjacent and along said measuring member.

3. The measurement system of claim 2 further characterized in that said linear measuring member is a tape having coded distance measuring information formed therein.

4. The measurement system of claim 3 further characterized in that said coded distance measurement information is formed by space openings in said tape.

5. The measurement system of claim 2 further characterized by and including a threaded rod extending adjacent said linear measuring member, said movable element being movable on said threaded rod along said linear measuring member and toward and away from said second measuring means.

6. The measurement system of claim 5 further characterized in that said threaded rod is rotatable, with rotation of said threaded rod being directly proportional to linear movement of said movable element.

7. The measurement system of claim 6 further characterized in that said second measuring means includes a rotatable disc fixed to said threaded rod, and sensing means positioned adjacent said disc and sensitive to rotation thereof.

8. The measurement system of claim 7 further characterized in that said disc has alternate areas of differing light transmissive ability, said sensing means including a light transmitter and a photocell positioned on opposite sides of said disc.

9. The measurement system of claim 5 further characterized in that said first measuring means includes a punched tape linearly extending adjacent said threaded rod, and sensing means carried by said movable element along said tape for use in sensing the position of the movable element relative to the tape.

10. The measurement system of claim 1 further characterized in that said electronic circuit means includes means for directional discrimination of the direction of movement of said movable element relative to said second measuring means.

* * * * *